United States Patent
Pentek et al.

(10) Patent No.: US 8,323,727 B2
(45) Date of Patent: Dec. 4, 2012

(54) METHOD FOR MANUFACTURING A PERPENDICULAR MAGNETIC WRITE HEAD HAVING A TAPERED WRITE POLE AND A STEPPED WRAP AROUND SIDE SHIELD GAP

(75) Inventors: Aron Pentek, San Jose, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 545 days.

(21) Appl. No.: 12/641,138

(22) Filed: Dec. 17, 2009

(65) Prior Publication Data

US 2011/0147222 A1    Jun. 23, 2011

(51) Int. Cl.
    *C23C 14/32* (2006.01)
(52) U.S. Cl. ........... 427/129; 216/22; 360/110; 428/812
(58) Field of Classification Search ............. 427/129, 427/130, 131; 29/603.14, 603.01; 360/125.03, 360/125.08, 125.11, 125.12, 125.15, 125.3; 428/812, 815.2; 216/22
See application file for complete search history.

(56) References Cited

U.S. PATENT DOCUMENTS

| | | | |
|---|---|---|---|
| 7,212,379 B2 | 5/2007 | Hsu et al. | 360/126 |
| 7,375,925 B2 | 5/2008 | Sasaki et al. | 360/126 |
| 7,503,107 B2 | 3/2009 | Koyama et al. | 29/603.18 |
| 2005/0219743 A1 | 10/2005 | Guan et al. | 360/125 |
| 2008/0151437 A1 | 6/2008 | Chen et al. | 360/319 |
| 2008/0244896 A1 | 10/2008 | Bonhote et al. | 29/603.01 |
| 2008/0316653 A1 | 12/2008 | Sasaki et al. | 360/319 |
| 2009/0059426 A1* | 3/2009 | Sasaki et al. | 360/125.02 |
| 2009/0091862 A1 | 4/2009 | Han et al. | 360/319 |
| 2009/0116145 A1 | 5/2009 | Guan et al. | 360/125.02 |
| 2009/0122445 A1 | 5/2009 | Jiang et al. | 360/123.12 |
| 2009/0141406 A1 | 6/2009 | Sasaki et al. | 360/319 |
| 2009/0154009 A1 | 6/2009 | Le | 360/110 |
| 2009/0154021 A1 | 6/2009 | Nunokawa et al. | 360/234.3 |
| 2009/0168257 A1* | 7/2009 | Hsiao et al. | 360/319 |

FOREIGN PATENT DOCUMENTS

| | | |
|---|---|---|
| JP | 2007/257711 | 10/2007 |
| JP | 2009/181641 | 8/2009 |

* cited by examiner

*Primary Examiner* — Michael Cleveland
*Assistant Examiner* — Tabassom Tadayyon Eslami
(74) *Attorney, Agent, or Firm* — Zilka-Kotab, PC

(57) ABSTRACT

A method for manufacturing a magnetic write head that has a trailing magnetic shield with a tapered write pole trailing edge, a non-magnetic step layer and a Ru bump and an alumina bump formed at the front of the non-magnetic step layer. The process forms a Ru/alumina side wall at the sides of the write pole, such that the Ru side wall is closest to the write pole. The Ru is removed more readily than the alumina during the ion milling that is performed to taper the write pole. This causes the Ru portion of the side wall to taper away from the write pole rather than forming an abrupt step. This tapering prevents dishing of the trailing edge of the write pole for improved write head performance.

22 Claims, 22 Drawing Sheets

METHOD FOR MANUFACTURING A PERPENDICULAR MAGNETIC WRITE HEAD HAVING A TAPERED WRITE POLE AND A STEPPED WRAP AROUND SIDE SHIELD GAP

FIELD OF THE INVENTION

The present invention relates to perpendicular magnetic recording and more particularly to a magnetic write head having a write pole with a non-magnetic step layer that provides additional spacing between the trailing magnetic shield and the write pole, and non-magnetic bump layer formed at the front edge of the non-magnetic step layer.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

SUMMARY OF THE INVENTION

The present invention provides a method for manufacturing a magnetic write head. A magnetic write pole layer is deposited, and a non-magnetic step layer is formed over the write pole layer, the non-magnetic step layer having a front edge surface that is removed from an air bearing surface plane such that the non-magnetic step layer does not extend to the air bearing surface plane. First and second sides are formed on the magnetic write pole layer to define a write pole, and then a layer of Ru is deposited. A first ion milling is performed to preferentially remove horizontally disposed portions of the Ru layer, leaving a Ru bump at the front edge surface of the non-magnetic step layer and leaving first and second Ru side walls formed at the sides of the write pole. A second ion milling is then performed to form a first tapered portion on the write pole layer. Then, a layer of alumina is deposited. A third ion milling is then performed to remove horizontally disposed portions of the alumina layer leaving an alumina bump at an edge of the Ru bump and leaving first and second alumina side walls adjacent to the first and second Ru side walls, and a fourth ion milling is performed to form a second tapered portion on the write pole. A non-magnetic trailing gap layer can then be deposited and a trailing wrap around shield formed over the non-magnetic trailing gap layer.

This process results in a bi-layer side wall gap, wherein the Ru side walls are closest to the write pole and the alumina side walls are away from the write pole. Because Ru is more easily and quickly removed by ion milling than alumina, the ion milling used to form the second tapered portion causes the trailing edge of the Ru side gap to taper gently away from the write pole rather than forming an abrupt step. This tapering prevents the trailing edge of the write pole from becoming dished during ion milling.

The process can be used with a write pole that has been formed by various processes. For example the write pole can be formed by a dry etch process wherein the write pole material is deposited full film, a mask is formed over the write pole material and an ion milling process is used to form the write pole. The write pole could also be produced by a damascene process wherein a RIEable fill layer such as $SiO_2$ or $Al_2O_3$ is deposited, a trench in the shape of a write pole is formed in the fill layer, and a magnetic material is electroplated into the trench.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
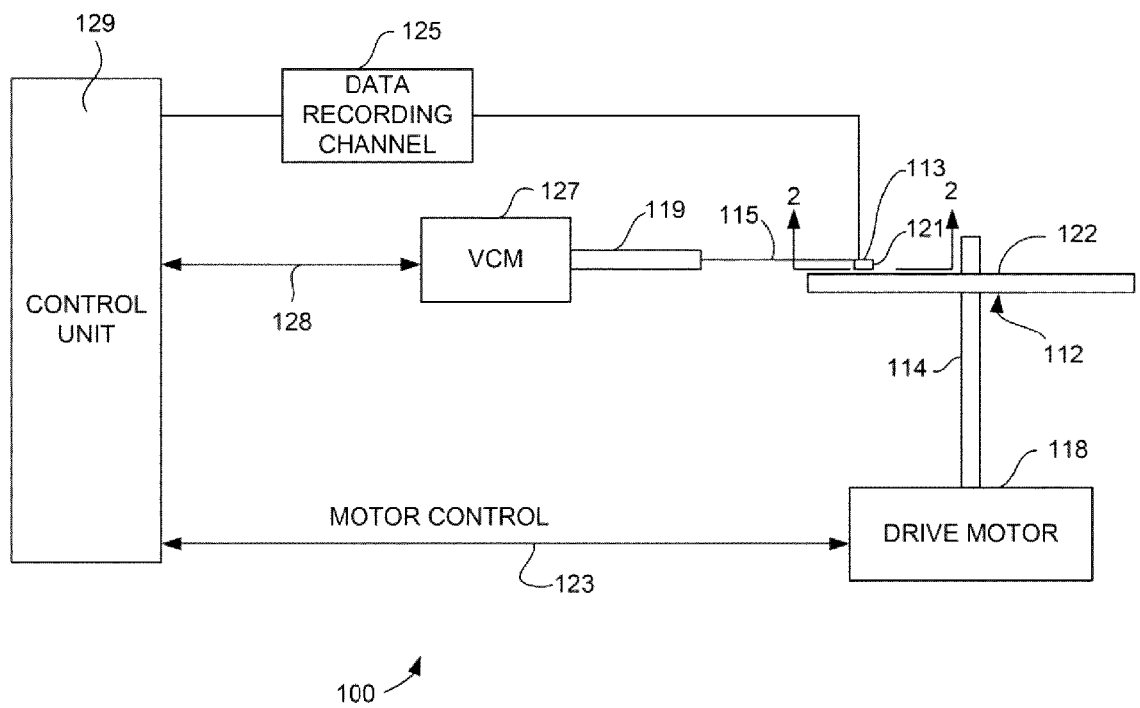
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
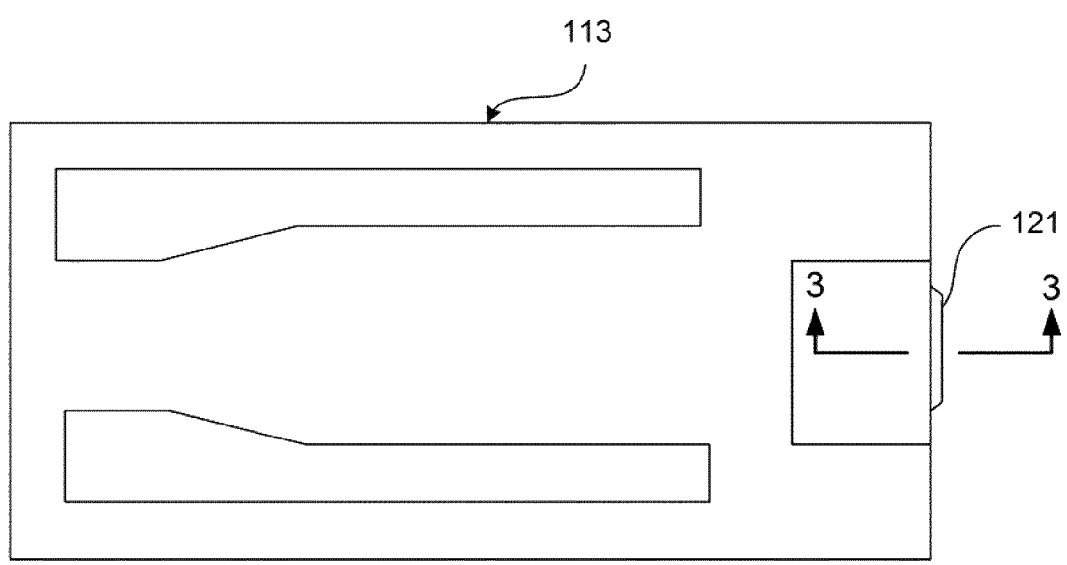
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
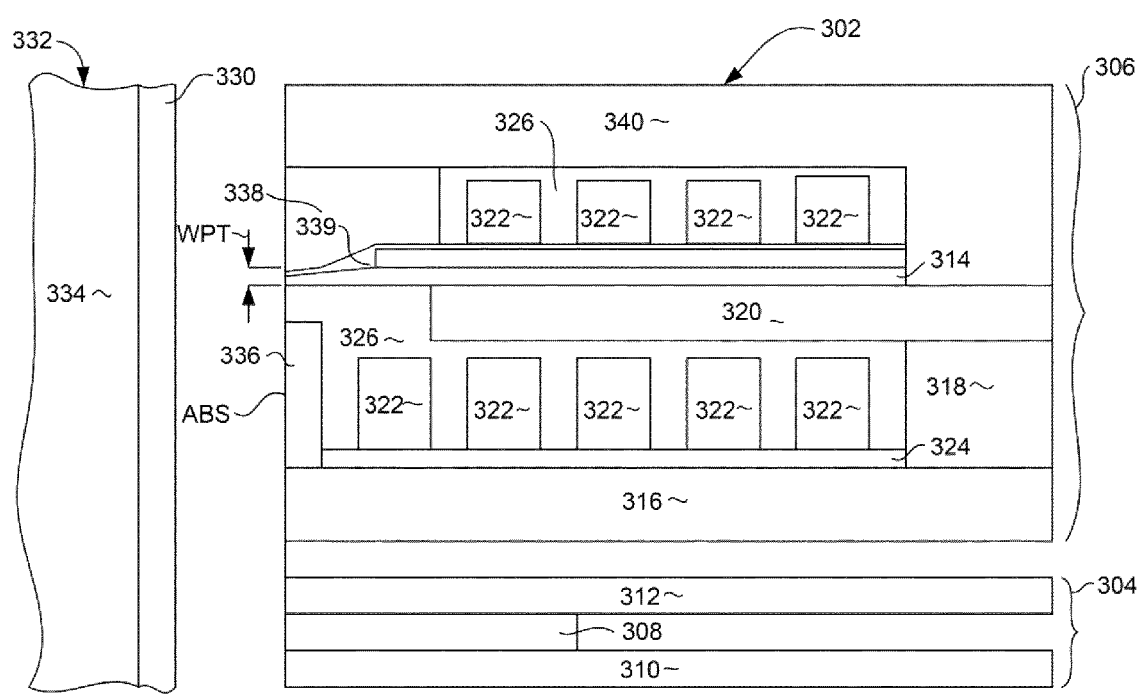
FIG. 3 is a cross sectional view of a magnetic head, taken from line 3-3 of FIG. 2 and rotated 90 degrees counterclockwise, of a magnetic head according to an embodiment of the present invention.

With reference now to FIG. 3, the invention can be embodied in a magnetic head 302. The magnetic head 302 includes a read head 304 and a write head 306. The read head 304 includes a magnetoresistive sensor 308, which can be a GMR, TMR, or some other type of sensor. The magnetoresistive sensor 308 is located between first and second magnetic shields 310, 312.

The write head 306 includes a magnetic write pole 314 and a magnetic return pole 5 316. The write pole 314 can be formed upon a magnetic shaping layer 320, and a magnetic back gap layer 318 magnetically connects the write pole 314 and shaping layer 320 with the return pole 316 in a region removed from the air bearing surface (ABS). A write coil 322 (shown in cross section in FIG. 3) passes between the write pole and shaping layer 314, 320 and the return pole 316, and may also pass above the write pole 314 and shaping layer 320. The write coil 322 can be a helical coil or can be one or more pancake coils. The write coil 322 can be formed upon an insulation layer 324 and can be embedded in a coil insulation layer 326 such as alumina and or hard baked photoresist.

In operation, when an electrical current flows through the write coil 322, a resulting magnetic field causes a magnetic flux to flow through the return pole 316, back gap 318, shaping layer 320 and write pole 314. This causes a magnetic write field to be emitted from the tip of the write pole 314 toward a magnetic medium 332. The write pole 314 has a cross section at the ABS that is much smaller than the cross section of the return pole 316 at the ABS. Therefore, the magnetic field emitting from the write pole 314 is sufficiently dense and strong that it can write a data bit to a magnetically hard top layer 330 of the magnetic medium 332. The magnetic flux then flows through a magnetically softer under-layer 334, and returns back to the return pole 316, where it is sufficiently spread out and weak that it does not erase the data bit recorded by the write pole 314. A magnetic pedestal 336 may be provided at the air bearing surface ABS and attached to the return pole 316 to prevent stray magnetic fields from the bottom leads of the write coil 322 from affecting the magnetic signal recorded to the medium 332.

In order to increase write field gradient, and therefore increase the speed with which the write head 306 can write data, a trailing, wrap-around magnetic shield 338 can be provided. The trailing, wrap-around magnetic shield 338 is separated from the write pole by a non-magnetic trailing gap layer 339.

The trailing shield 338 attracts the magnetic field from the write pole 314, which slightly cants the angle of the magnetic field emitting from the write pole 314. This canting of the write field increases the speed with which write field polarity can be switched by increasing the field gradient. A trailing magnetic return pole 340 can be provided and can be magnetically connected with the trailing shield 338. Therefore, the trailing return pole 340 can magnetically connect the trailing magnetic shield 338 with the back portion of the write pole 302, such as with the back end of the shaping layer 320 and with the back gap layer 318. The magnetic trailing shield is also a second return pole so that in addition to magnetic flux being conducted through the medium 332 to the return pole 316, the magnetic flux also flows through the medium 332 to the trailing return pole 340.

The construction of the trailing shield 338 involves a tradeoff between increasing field gradient and minimizing the leakage of magnetic write field from the write pole 314 to the trailing shield. In order to maximize the field gradient, magnetic saturation of the trailing shield 338 should be minimized, and the spacing between the shield 338 and write pole 314 should be minimized. On the other hand, in order to prevent the loss of magnetic write field, a certain minimum amount of spacing between the write pole 314 and shield 338 must be maintained.

Figure 4:
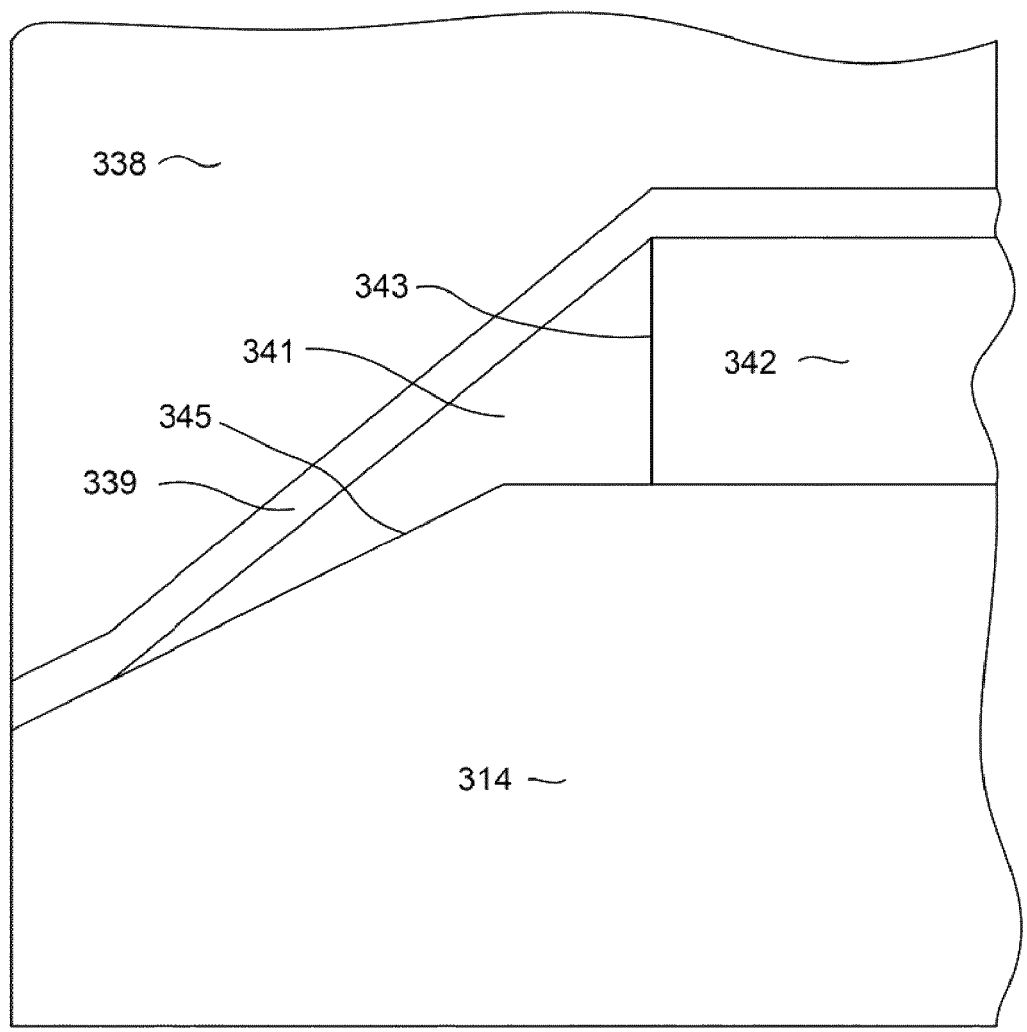
FIG. 4 is an enlarged view of a portion of the write head of FIG. 3, showing a pole tip region of the write head.

In order to achieve an optimal balance between field gradient and write field strength, the write pole 314 has a non-magnetic step 342 that provides additional spacing between the write pole 314 and the trailing shield 338 at a location that is somewhat removed from the air bearing surface. The step 342 (which can be seen more clearly in FIG. 4) has a front edge 343, and a non-magnetic bump layer 341 is formed at this front edge of the step 342. The location of the front edge of the trailing edge step 342 is preferably behind the flare point (not shown in FIGS. 3 and 4). The step layer 342 can be constructed of a RIEable material (i.e. a material that is capable of being removed by reactive ion etching) such as SiC, $Al_2O_3$, Ta, TaO, $Ta_2O_5$, $SiO_2$, SiN, $SiO_xN_y$, etc. The bump layer 341 is preferably a multi-layer structure that includes a portion that is constructed of ($Al_2O_3$) and a portion that is constructed of Ru. This will become clearer after discussion of a method of manufacturing a magnetic write head as described below with reference to FIGS. 6-21. It can also be seen, that the write pole 314 has a tapered trailing edge portion 345 that helps to channel magnetic flux into the pole tip portion of the write pole 314 without saturating the write pole 314, thereby providing maximum write field.

Figure 5:
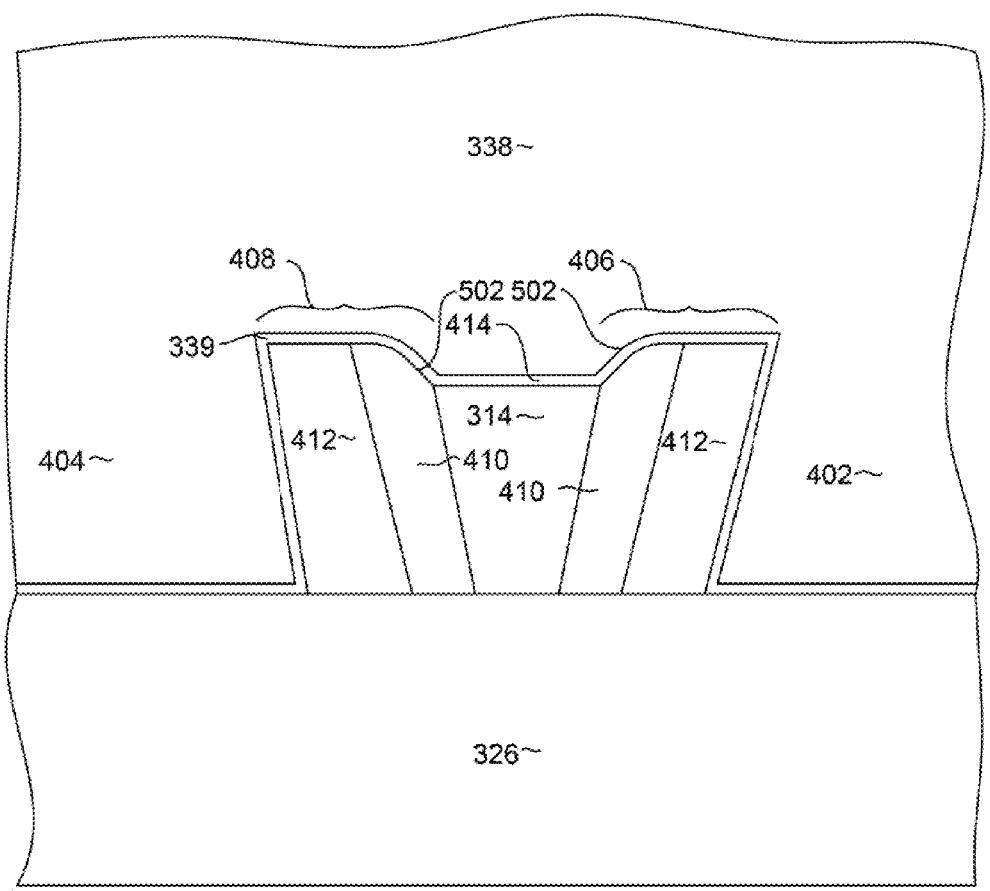
FIG. 5 is an air bearing surface view of the pole tip portion of the head of FIGS. 3 and 4.

FIG. 5 shows an air bearing surface view of the pole tip portion of the write head 302. As can be seen, the trailing-wrap-around magnetic shield has side portions 402, 404 that extend down beside the write pole 314. These side shielding portions 402, 404 prevent stray fields from the write head from causing adjacent track interference and help to better define the track width of the signal written to the media. The side portions 402, 404 are separated from the write pole 314 by non-magnetic side gap layers 406, 408 that can each be comprised of a layer of Ru 410 and a layer of alumina (for reasons that will become clearer below). Also as can be see, the write pole 314 has a flat (non-dished) trailing edge 414, and the non-magnetic side walls extend upward beyond the trailing edge 414 of the write pole 314. This non-dished trailing edge 414 of the write pole 314 is made possible by the use of the Ru/alumina bi-layer side walls 410, 412. As can be seen, in FIG. 5, the top (or trailing portion) of the Ru side walls 410 each have a curved or tapered trailing edge 502 that tapers from the trailing edge 414 of the write pole 314 to the alumina side wall 412. This curved taper is the result of the Ru being more readily removed by ion milling than the alumina side wall. This tapered shape of the edge 502, prevents shadowing and the formation of re-deposited write pole material (re-dep) during manufacturing. All of this will become clearer below with regard to a discussion of a method for manufacturing a magnetic write head according to an embodiment of the invention.

Figure 6:
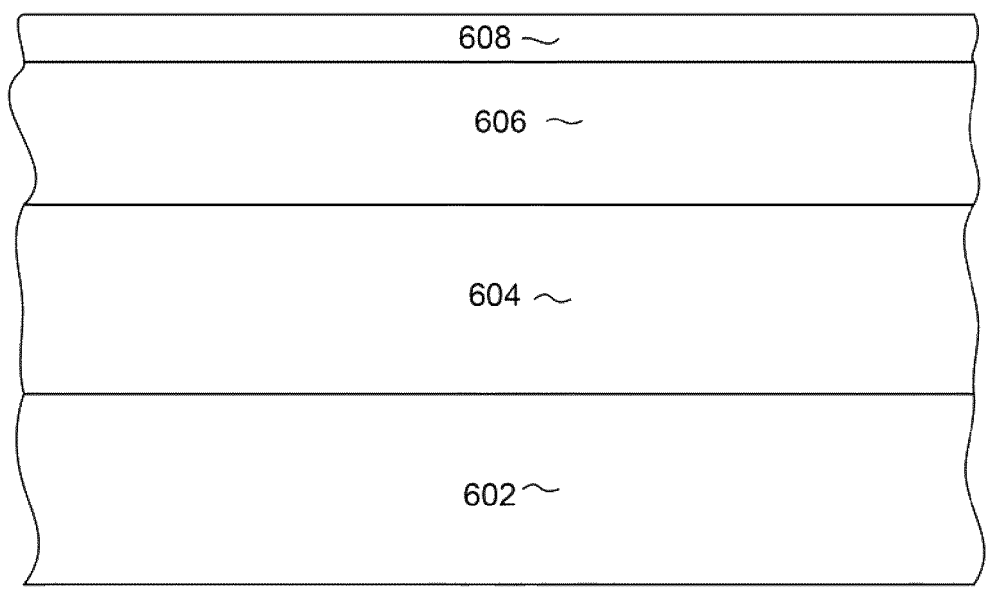
FIGS. 6-22 show a portion of a write head in various intermediate stages of manufacture illustrating a method for manufacturing a write head according to an embodiment of the invention.

FIGS. 6-22 illustrate a method for manufacturing a magnetic write head according to an embodiment of the invention. With particular reference to FIG. 6, a substrate 602 is provided. This substrate 602 can include a portion that is constructed of a non-magnetic material such as alumina and a portion which includes a magnetic material, and has a flat surface. More particularly, the substrate 602 can include the non-magnetic fill layer 326 and magnetic shaping layer 320 of FIG. 3. A layer of write pole material 604 is deposited over the substrate 602. The write pole material is preferably a lamination of magnetic layers such as CoFe separated from one another by thin non-magnetic layers (not shown).

A layer of non-magnetic step material 606 is deposited over the write pole material 604. The non-magnetic step material is preferably a RIEable, non-magnetic material. The non-magnetic step layer 606 is preferably SiC, but can also be constructed of NiCr, $Al_2O_3$, Ta, TaO, Diamond Like Carbon (DLC) $SiO_2$ or SiN and preferably has a thickness of 50 to 300 nm or about 100 nm. A layer of RIE resistant mask material 608, preferably Cr, is deposited over the non-magnetic step layer 606, and is preferably deposited to a thickness of 5-30 nm or about 10 nm.

Figure 7:
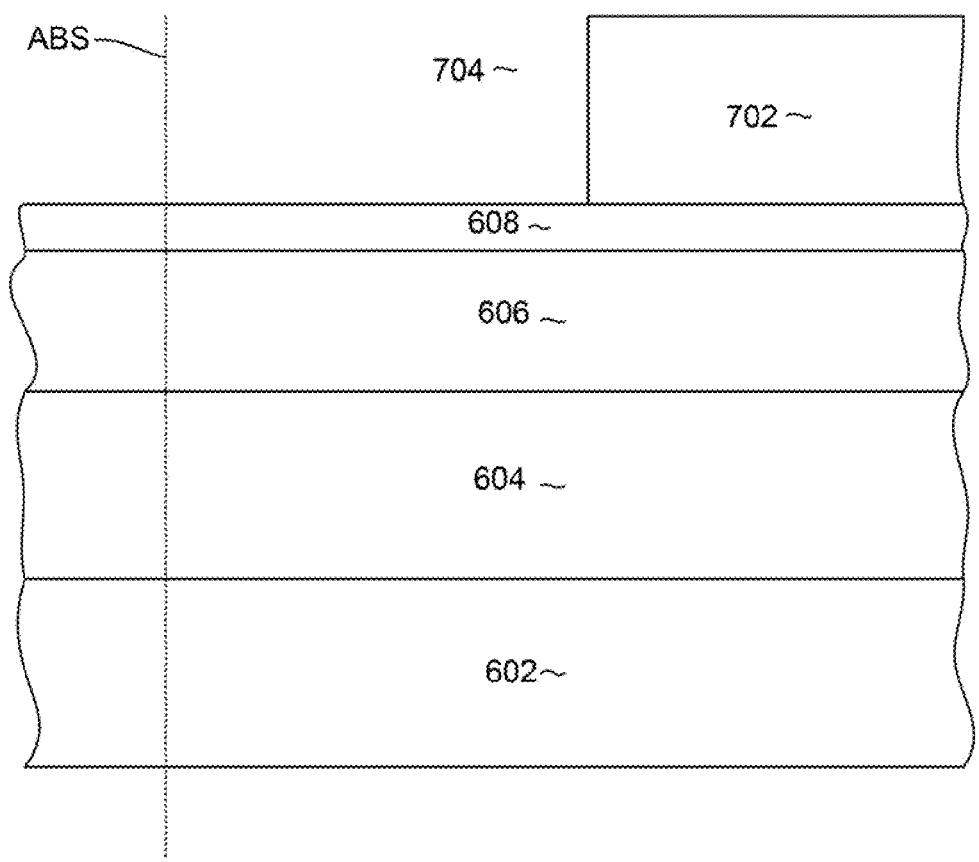
Figure 8:
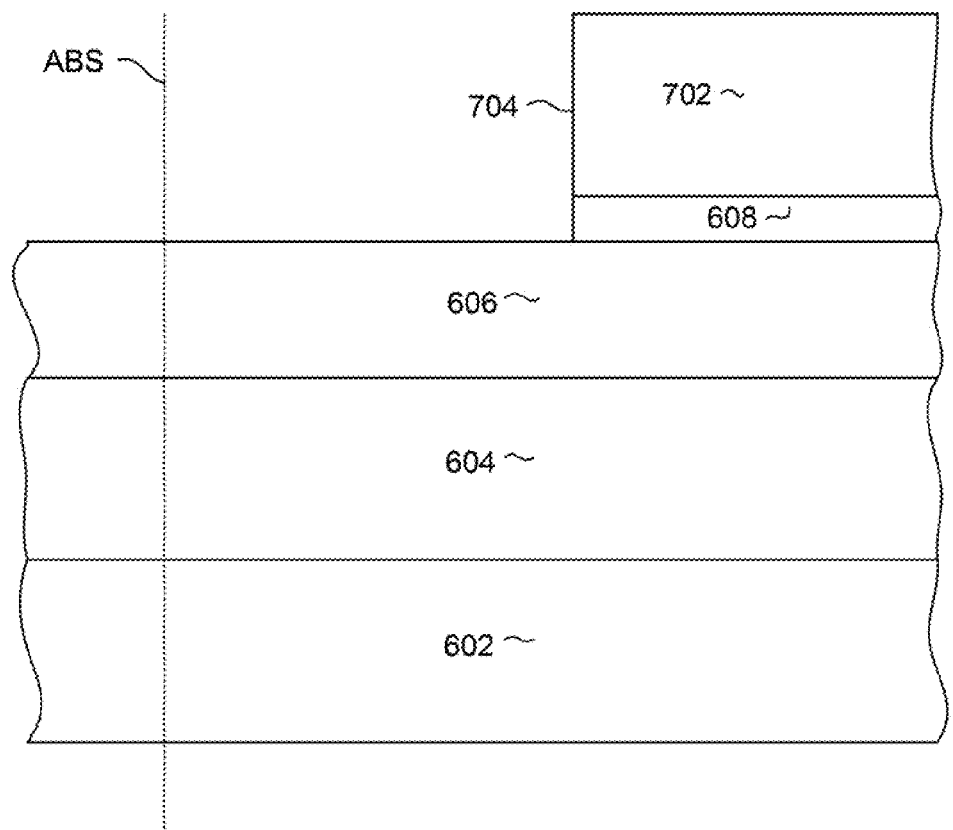
Figure 9:
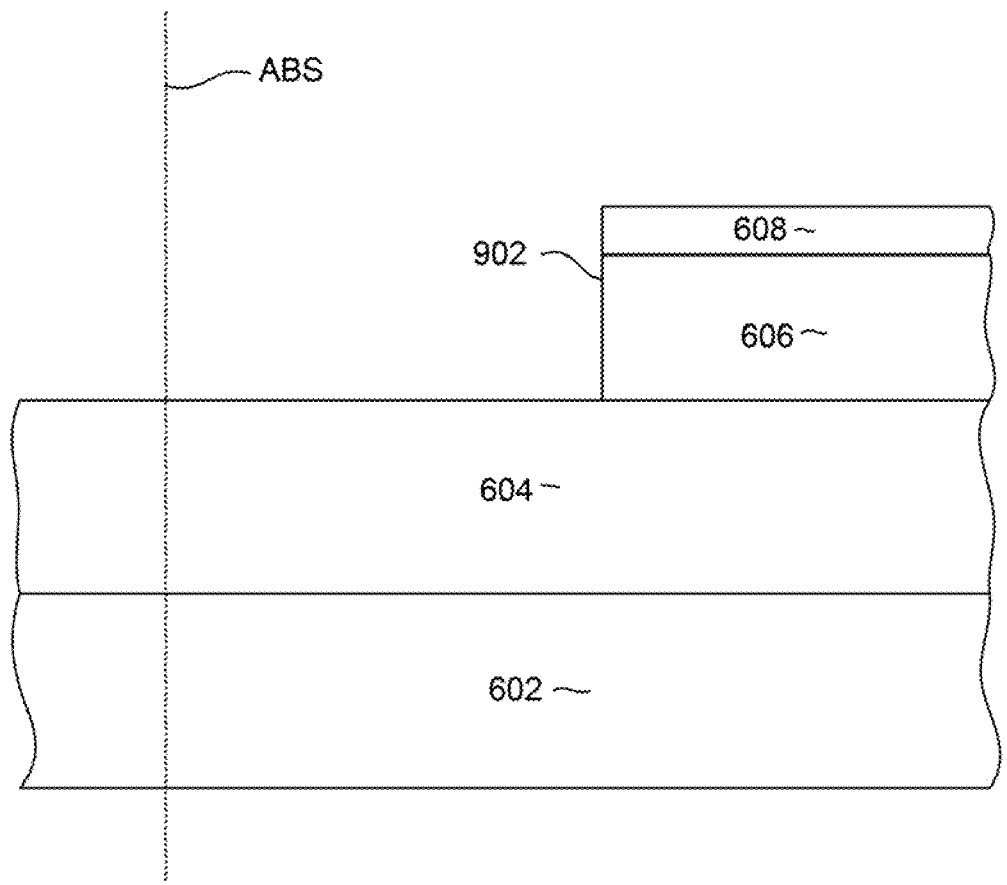

Then, with reference to FIG. 7, a photoresist layer is deposited over the RIE mask 608 and is photolithographically patterned and developed to form a mask 702 having an edge 704 that is located a desired distance from an intended air bearing surface plane ABS. Then, an ion milling is performed to remove portions of the RIE mask 608 that are not protected by the photoresist mask 702 in order to transfer the image of the photoresist mask onto the underlying RIE mask 608, leaving a structure as shown in FIG. 8. The resist mask can then be lifted off and a reactive ion etching (RIE) is then performed to remove portions of the non-magnetic step layer 606 that are not protected by the RIE mask 608 to transfer the image of the RIE mask onto the underlying step layer 606, leaving a structure as shown in FIG. 9. These processes are preferably performed so as to leave the step layer 606 with a front edge 902 that is located 100-200 nm from the ABS plane, or about 150 nm from the ABS plane.

Figure 10:
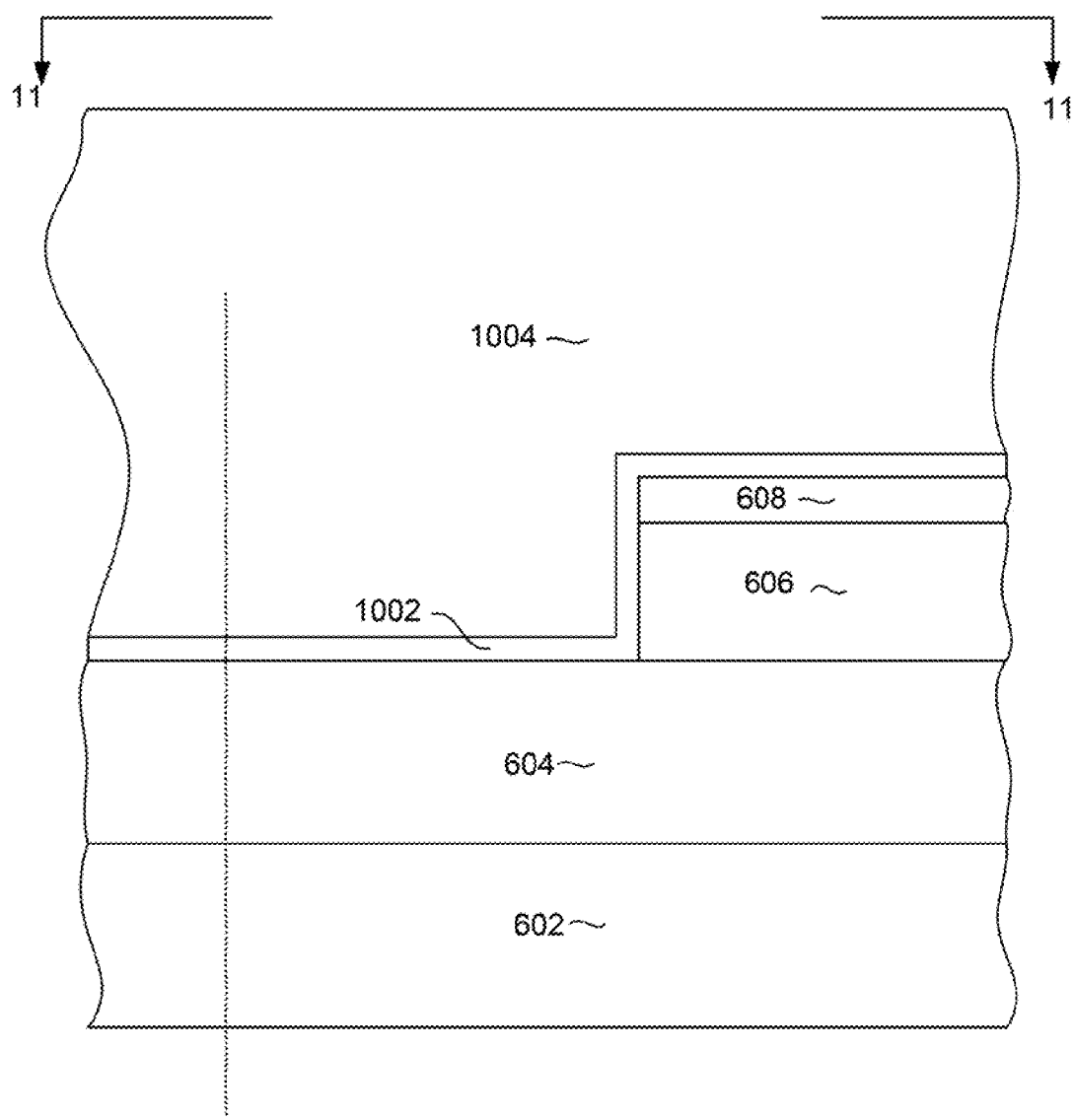
Figure 11:
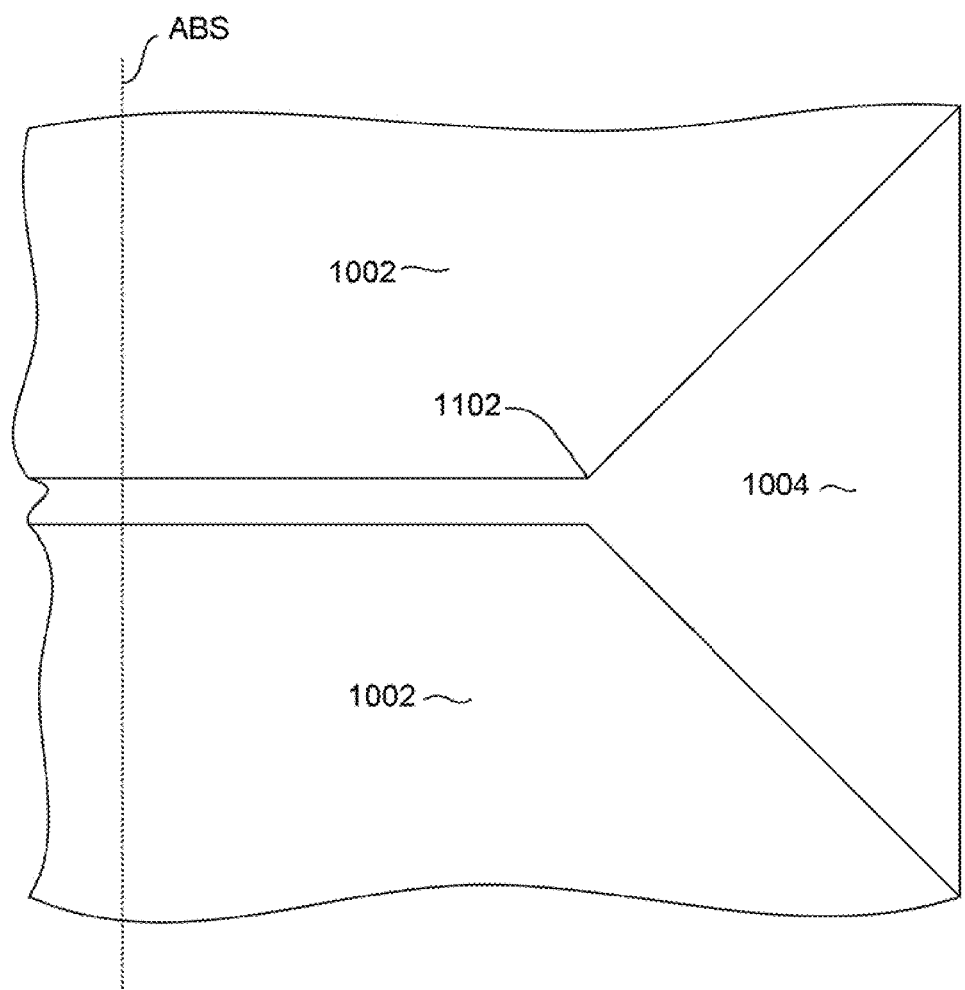
Figure 12:
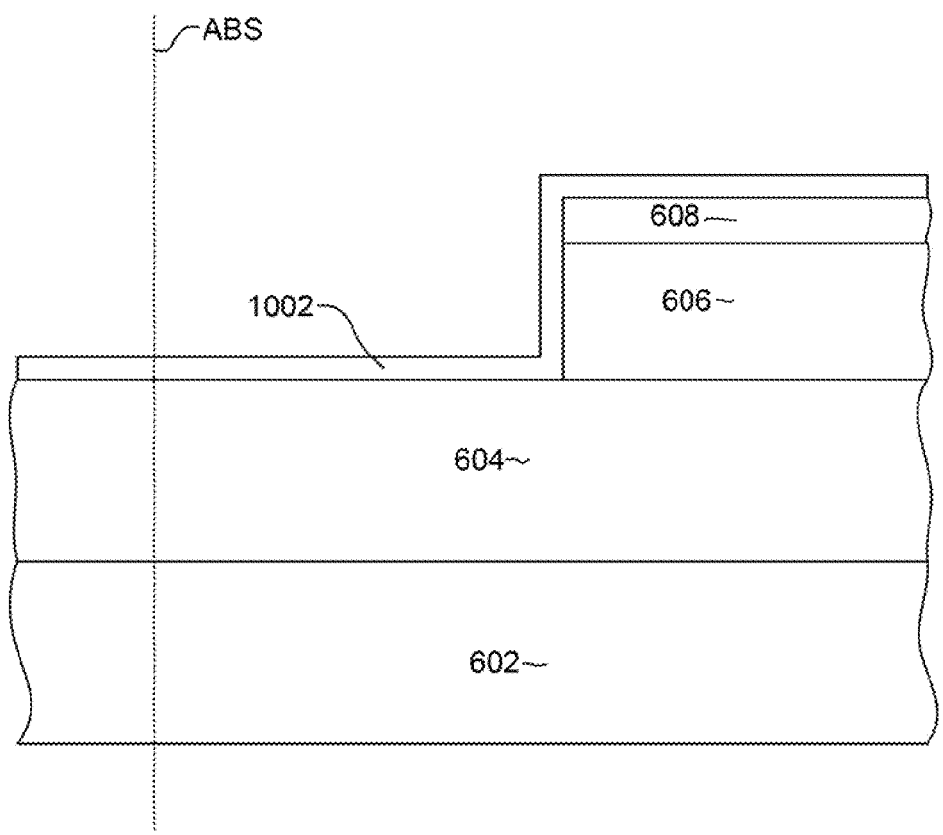

Then, with reference to FIG. 10 a thin hard mask layer 1002 such as Diamond Like Carbon (DLC) is deposited and a write pole defining mask structure 1004 is formed over the hard mask layer 1002. The mask 1004 can include a photolithographically patterned photoresist mask, but can also include other layers such as, but not limited to, additional hard mask layers, an image transfer layer and a bottom antireflective coating (BARC), although these layers are not depicted individually in FIG. 10. The mask 11 is formed so as to define a write pole shape, which can be seen more clearly with reference to FIG. 10, which shows a top down view as seen from line 11-11 of FIG. 10. As can be seen in FIG. 11, the mask 1004 defines a flare point 1102 that is located a desired distance from the ABS plane. With the mask 1004 in place, an ion milling process is performed to remove portions of the hard mask 1002 and write pole material (FIG. 10) that are not protected by the mask 1004 in order to define a write pole. This ion milling process can be a sweeping ion milling and can be performed at an angle or at various angles (relative to normal) that are chosen to define the write pole with a desired trapezoidal shape, as seen with the write pole 314 in FIG. 5. After this ion milling process has been accomplished to define the write pole, the mask 1004 can be lifted off, leaving a structure as shown in side cross sectional view in FIG. 12.

The above process for forming the write pole 314, describes a dry stack method for constructing a write pole. This method includes depositing the write pole material as a full film layer, then forming a mask over the layer and ion milling to define the write pole. It should be pointed out, however, that this only by way of example. Other methods for constructing the initial write pole would be suitable with the present invention as well. For example, the write pole could be constructed by a damascene method wherein a trench or opening is formed in a RIEable fill layer and is shaped to define the write pole, and then a magnetic material is electroplated into the trench to form the write pole.

Figure 13:
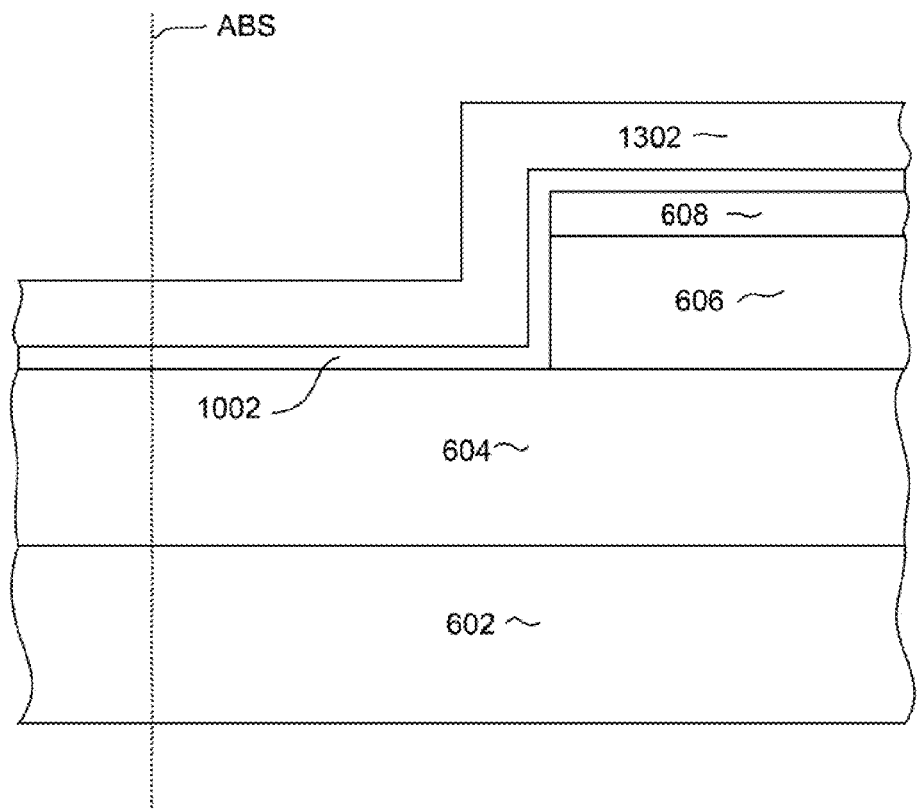

Then, with reference to FIG. 13, a layer of non-magnetic material 1302 is deposited. This layer 1302 is preferably Ru. The use of Ru is advantageous for reasons that can be better understood hereinbelow. The non-magnetic material 1302 is preferably deposited by a conformal deposition process such as atomic layer deposition (ALD), and is preferably deposited to a thickness of 20-40 nm or about 30 nm.

Figure 14:
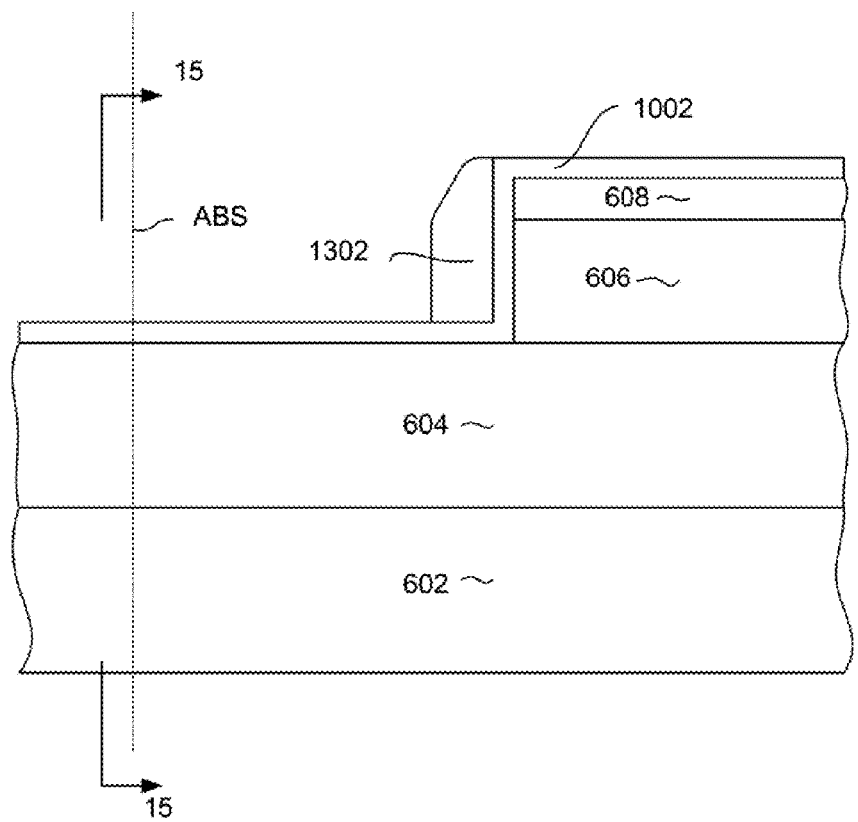
Figure 15:
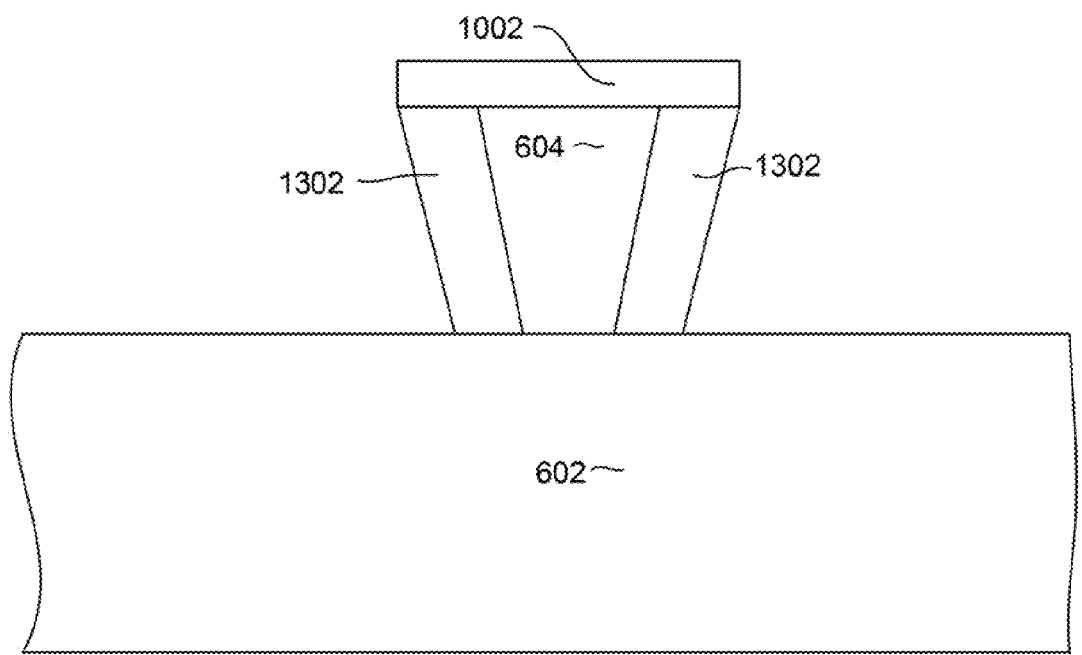

An ion milling is then performed to preferentially remove horizontally disposed portions of the non-magnetic layer 1302. This leaves a non-magnetic bump 1302 formed at the front edge of the step layer 606 and hard mask 1002 as shown in FIG. 14. This ion milling also leaves non-magnetic side walls 1302 formed at the sides of the write pole 604. This can be seen with reference to FIG. 15, which shows a view taken along the ABS plane as viewed from line 15-15 of FIG. 14.

Figure 16:
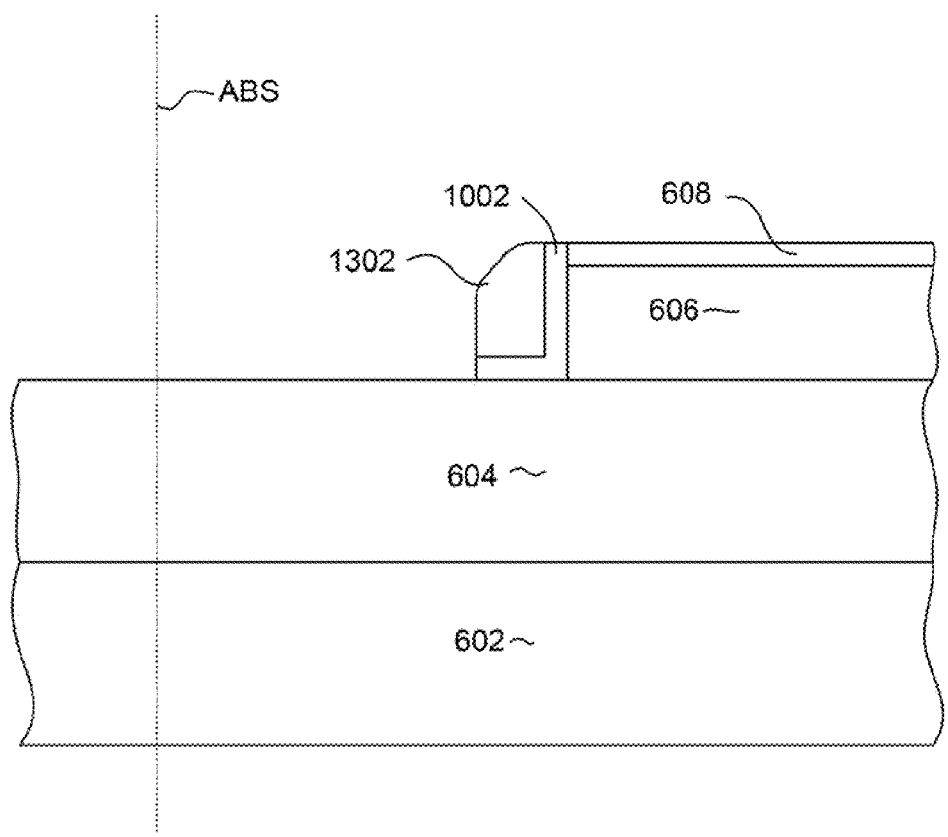

A quick reactive ion milling (RIE) can then be performed to remove portions of the hard mask layer 1002 that are not protected by the non-magnetic bump 1302, leaving a structure such as that shown in FIG. 16. At this point the non-magnetic bump 1302 is preferably separated from the ABS plane by a distance of 100-150 nm or about 120 nm. It can also be seen that there is no residual hard mask 1002 at the ABS, and that any remaining hard mask material 1002 beneath the bump 1302 is removed a significant distance (e.g. about 120 nm) from the ABS plane. This, therefore, significantly reduces the risk of exposing residual hard mask at the trailing edge of the write pole at the ABS (which can result from slight misalignment at wafer processing or from the back end slider lapping process being off targeting). This benefit is the result of the increased distance between ABS and the front edge of residual hard-mask, which is at the same position as front edge of 1302 in FIG. 16.

Figure 17:
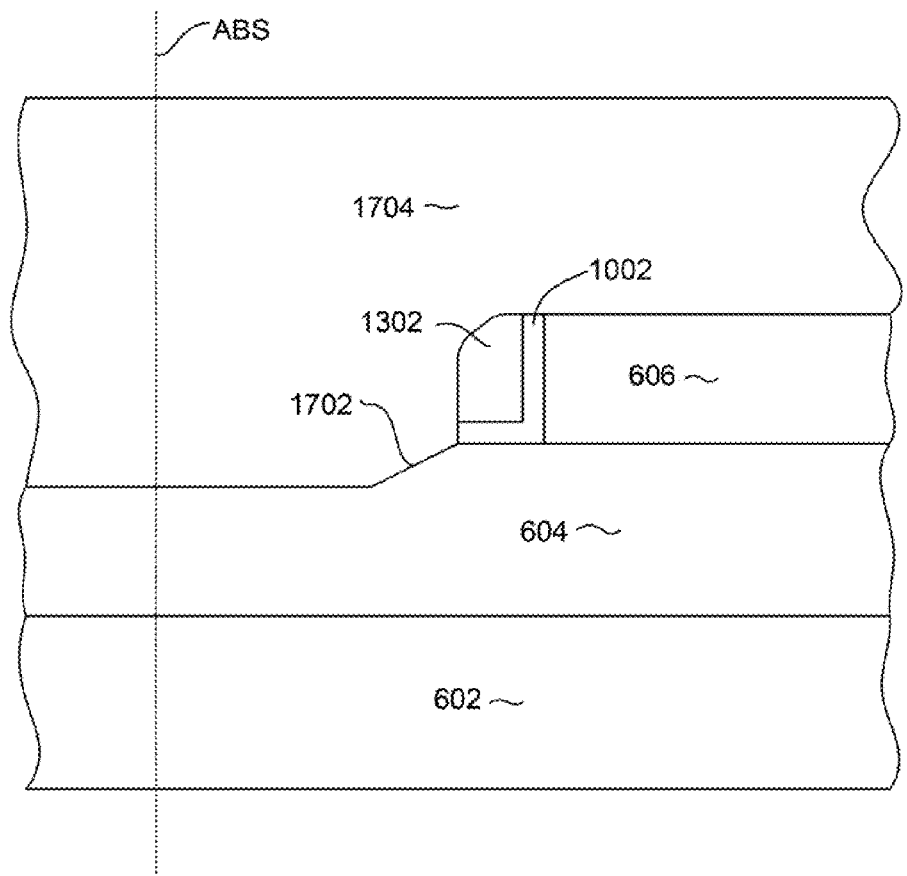

Then, an optional first taper ion milling can be performed to remove a portion of the write pole layer to form a first tapered portion 1702. This ion milling also removes the remaining Cr mask layer, leaving a structure as shown in FIG. 17. A thick layer of non-magnetic material 1704, preferably alumina ($Al_2O_3$) is deposited, preferably by a conformal deposition process such as atomic layer deposition (ALD). This layer 1704 is deposited to a thickness to completely cover the write pole 604 as well as the bump 1302 and step layer 606. The non-magnetic layer 1704 is, therefore, preferably deposited to a thickness of 50-70 nm or about 60 nm.

Figure 18:
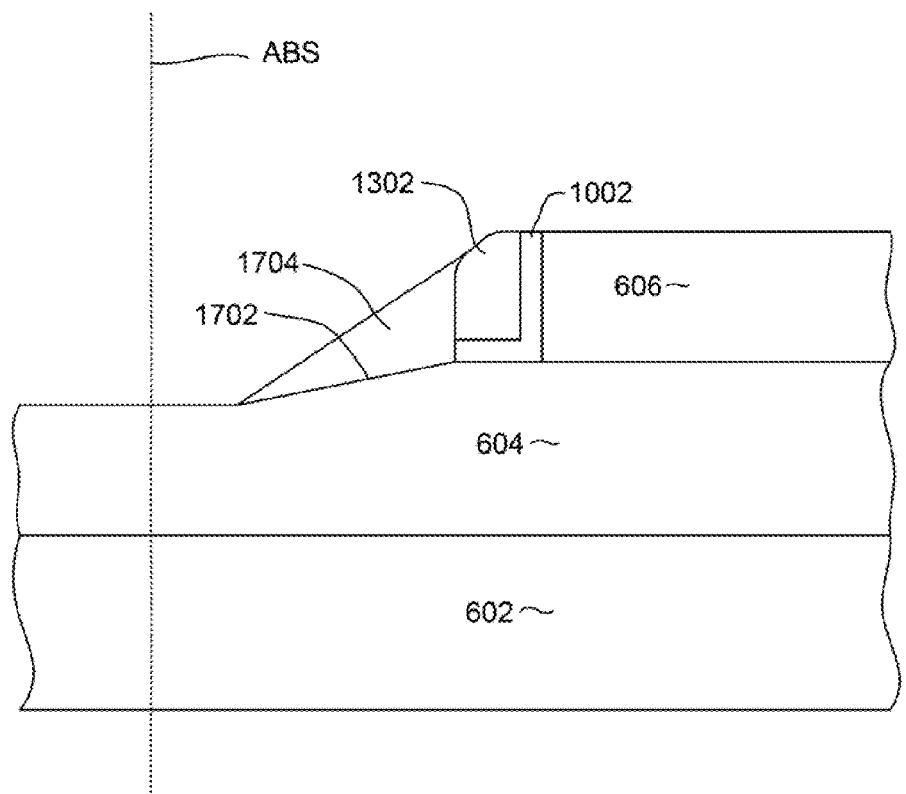
Figure 19:
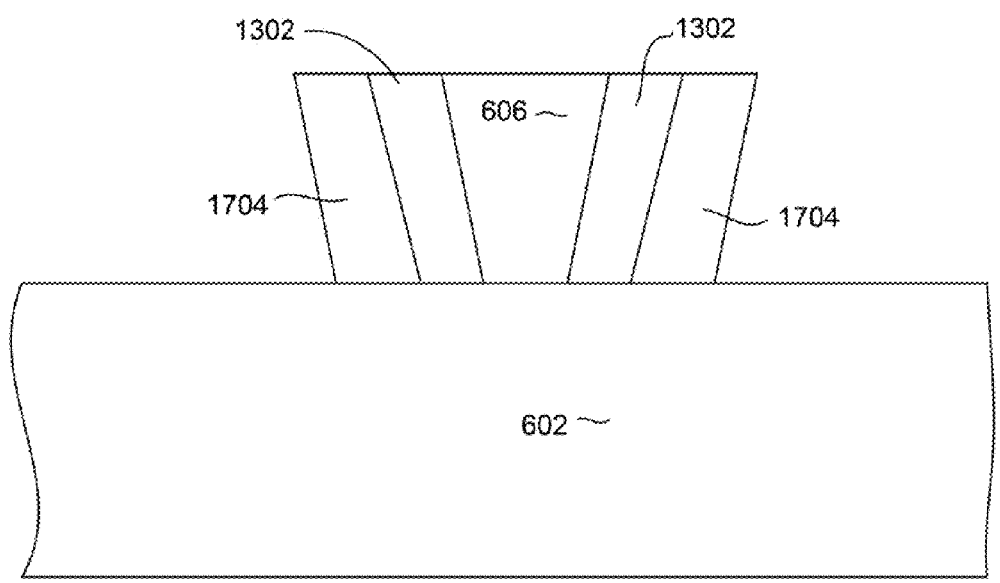

Another ion milling is then performed to preferentially remove horizontally disposed portions of the non-magnetic layer 1704. This ion milling results in a second non-magnetic bump 1704 being formed in front of the first non-magnetic bump 1302 and over the first tapered portion 1702, as shown in FIG. 18. This ion milling also result in a second set of non-magnetic side walls 1704 being formed at the sides of the write pole 604 as shown in FIG. 19.

Figure 20:
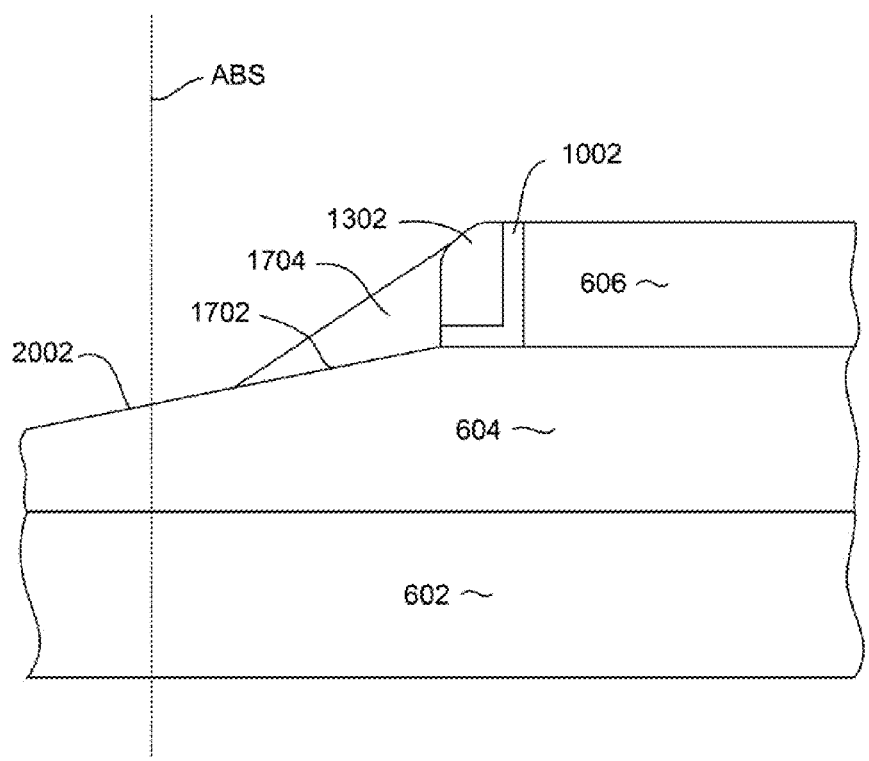

Another ion milling can then be performed to remove a portion of the write pole 604, thereby forming a second tapered trailing edge portion that extends from the second bump 1704 (and the first tapered trailing edge portion 1702) to a point beyond the ABS plane as shown in FIG. 20.

Figure 21:
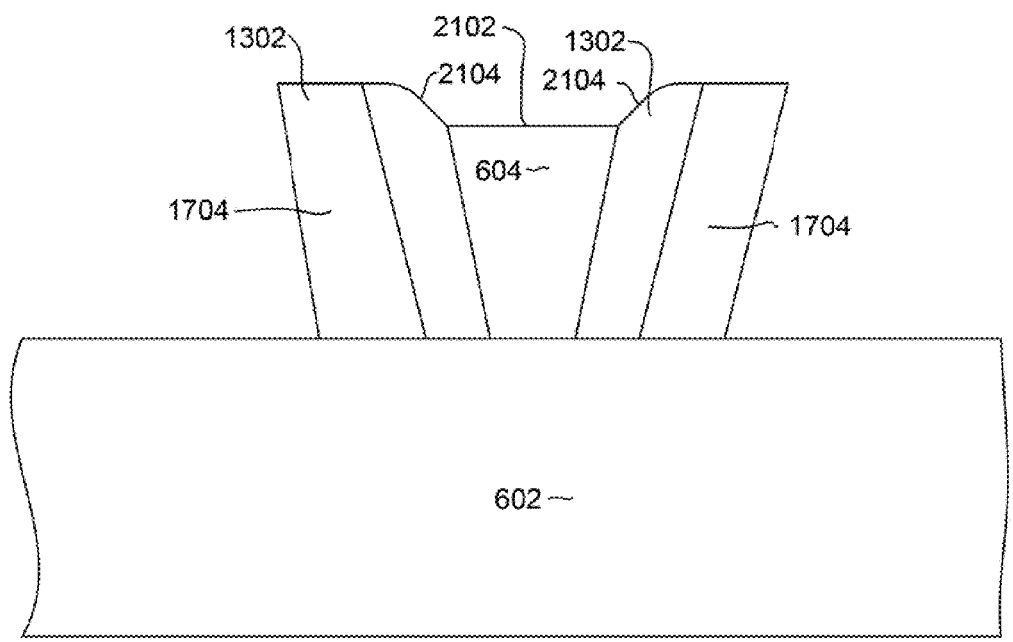

FIG. 21 shows a view of a plane that is parallel with the ABS as seen from line 21-21 of FIG. 20. The last ion milling (used to form the second tapered trailing edge portion 2002 removes the write pole material 604 faster than the non-magnetic side walls 1302, 1704. This causes the non-magnetic side walls 1302, 1704 to extend beyond the trailing edge 2102 of the write pole as shown in FIG. 21. In addition, however, the Ru side wall layers 1302 are more quickly removed by the ion milling than the alumina side wall layers 1704. This causes the ion milling to form the gently sloped, tapered trailing edges 2104 on the Ru side walls 1302. This also allows the trailing edge 2102 of the write pole 604 to be formed with a desired straight, non-dished shape as shown. Prior art processes, which employed side walls gap layers constructed entirely of alumina, had an abrupt step between the trailing edge of the write pole and the further extending side wall after the ion milling was performed to form the tapered trailing edge. This abrupt step resulted in shadowing which caused the center of the write pole to be milled faster than the outer edges, thereby resulting in a dished shape. Such abrupt side walls also resulted in re-deposited material (re-dep) accumulating at the outer edges of the write pole (against the side or step of the side gap) thereby further increasing the effective dishing of the write pole. Therefore, it can be seen that the above described process prevents such dishing, allowing the write pole to maintain a straight, non-dished trailing edge 2102.

Figure 22:
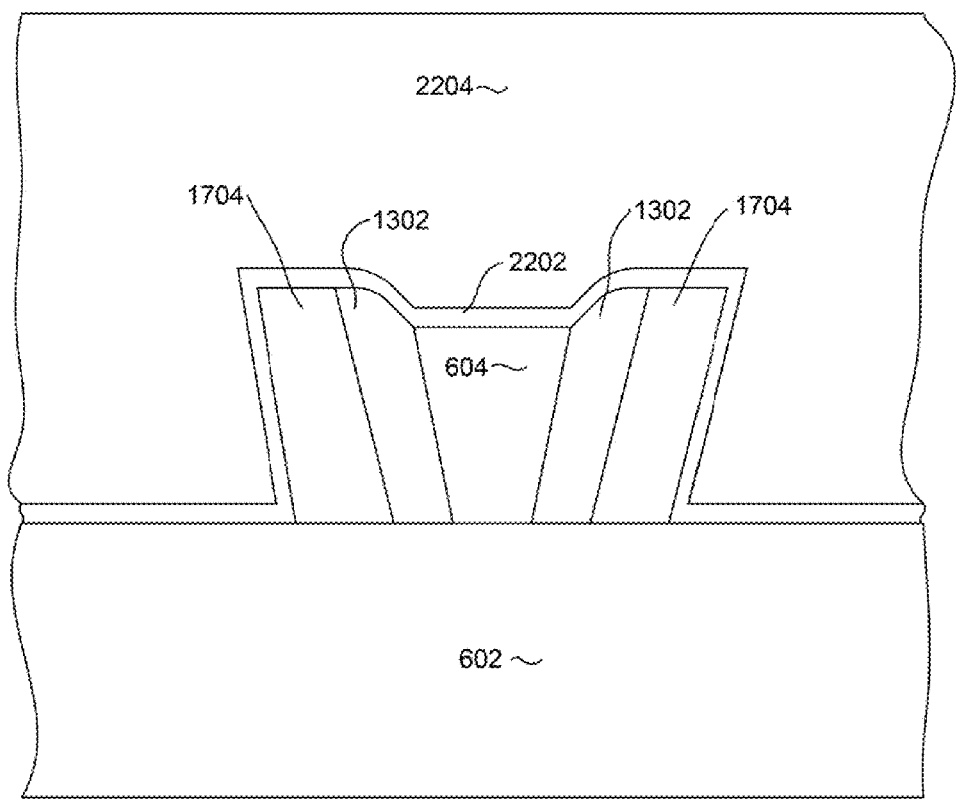

Then, with reference to FIG. 22, a non-magnetic trailing gap layer 2202 can be deposited by a conformal deposition process such as atomic layer deposition. A magnetic trailing, wrap-around shield 2204 can then be formed over the trailing gap layer by electroplating a material such as NiFe or CoFe into an electroplating frame mask (not shown). If the trailing gap layer 2202 is constructed of an electrically conductive non-magnetic material such as Ru, then the layer 2202 can be used as an electroplating seed layer for electroplating the shield 2204.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic write head, comprising:
  depositing a magnetic write pole layer;
  forming a non-magnetic step layer over the magnetic write pole layer, the non-magnetic step layer having a front edge surface that is removed from an air hearing surface plane such that the non-magnetic step layer does not extend to the air bearing surface plane;

forming first and second sides on the magnetic write pole layer to define a write pole;

depositing a layer or Ru;

performing a first ion milling to preferentially remove horizontally disposed portions of the Ru layer, leaving a Ru bump at the front edge surface of the non-magnetic step layer and leaving first and second Ru side walls formed at the sides of the write pole;

performing a second ion milling to form a first tapered portion on the write pole layer;

depositing a layer of alumina;

performing a third ion milling to remove horizontally disposed portions of the alumina layer leaving an alumina bump at an edge of the Ru bump and leaving first and second alumina side walls adjacent to the first and second Ru side walls;

performing a fourth ion milling to form a second tapered portion on the write pole depositing a non-magnetic trailing gap layer; and forming a trailing, wrap around-magnetic shield over the non-magnetic gap layer.

2. The method as in claim 1 wherein the second tapered portion extends beyond the air bearing surface plane.

3. The method as in claim 1 wherein the alumina bump extends over the first tapered portion of the write pole.

4. The method as in claim 1 wherein the non-magnetic step layer comprises SiC.

5. The method as in claim 1 wherein the Ru is deposited to a thickness of 20-50 nm.

6. The method as in claim 1 wherein the alumina is deposited to 50-70 nm.

7. The method as in claim 1 wherein the second ion milling is a continuation of the first ion milling.

8. The method as in claim 1 wherein the fourth ion milling is a continuation of the third ion milling.

9. The method as in claim 1 wherein the forming first and second sides on the magnetic write pole layer to define a write pole further comprises, depositing a hard mask layer over the magnetic write pole material, and the non-magnetic step layer; forming a mask structure over the hard mask layer; and performing an ion milling processes to remove portions of the magnetic write pole material that are not protected by the mask structure.

10. The method as in claim 9 further comprising, performing the first ion milling to form the Ru bump, performing a reactive ion etching to remove portions of the hard mask layer that are not protected by the Ru bump.

11. The method as in claim 9 wherein the hard mask layer comprises carbon.

12. A method for manufacturing a magnetic write head, comprising:

forming a magnetic write pole, the write pole having first and second sides and a flare point;

forming a non-magnetic step layer over the magnetic write pole, the non-magnetic step layer having a front edge surface that is removed from an air bearing surface plane such that the non-magnetic step layer does not extend to the air bearing surface plane;

depositing a layer or Ru;

performing a first ion milling to preferentially remove horizontally disposed portions of the Ru layer, leaving a Ru bump at the front edge surface of the non-magnetic step layer and leaving first and second Ru side walls formed at the sides of the write pole;

performing a second ion milling to form a first tapered portion on the write pole layer;

depositing a layer of alumina;

performing a third ion milling to remove horizontally disposed portions of the alumina layer leaving an alumina bump at an edge of the Ru bump and leaving first and second alumina side walls adjacent to the first and second Ru side walls;

performing a fourth ion milling to form a second tapered portion on the write pole;

depositing a non-magnetic trailing gap layer; and forming a trailing, wrap around-magnetic shield over the non-magnetic gap layer.

13. The method as in claim 12 wherein the write pole is formed by a damascene process.

14. The method as in claim 12 wherein the write pole is formed by a process that includes forming a trench in a non-magnetic till layer and electroplating a magnetic material into the trench.

15. The method as in claim 12 wherein the front edge of the non-magnetic step layer is behind the flare point such that the flare point is between the front edge of the non-magnetic step layer and the air bearing surface plane.

16. The method as in claim 12 wherein the second tapered portion extends beyond the air bearing surface plane.

17. The method as in claim 12 wherein the alumina bump extends over the first tapered portion of the write pole.

18. The method as in claim 12 wherein the non-magnetic step layer comprises SiC.

19. The method as in claim 12 wherein the Ru is deposited to a thickness of 20-50 nm.

20. The method as in claim 12 wherein the alumina is deposited to 50-70 nm.

21. The method as in claim 12 wherein the second ion milling is a continuation of the first ion milling.

22. The method as in claim 12 wherein the fourth ion milling is a continuation of the third ion milling.

* * * * *